Patented Mar. 19, 1946

2,396,879

UNITED STATES PATENT OFFICE 2,396,879

SULPHUR-CONTAINING ESTERS

Henry D. Porter and Arnold Weissberger, Rochester, N. Y., assignors to Eastman Kodak Company, Rochester, N. Y., a corporation of New Jersey No Drawing. Application April 12, 1945,
Serial No. 588,066

3 Claims. (Cl. 260—455)

This invention relates to sulphur-containing esters, such as acylmercaptoalkanesulphonyl chlorides and to a process of making them.

In certain photographic systems such as the process described in Peterson U. S. patents, 2,296,306, granted September 22, 1942, and 2,353,754, granted July 18, 1944, and Weissberger, Kibler and Young U. S. patent application, Ser. No. 539,780, filed June 10, 1944, it is desirable to use compounds which combine with other properties, the presence of a sulphonamido group and of a mercapto group. The mercapto group in turn should be protected against oxidation during the synthesis of the compound, by an easily hydrolyzable group, i. e., an acyl group.

The mercapto group serves to form silver salts as disclosed in the patents and application above referred to, while the presence of the sulphonamido group increases the reactivity with solutes in processing solutions, for example, with the oxidized developing agent used in these processes. Color processes of the type above referred to use coupling compounds containing a reactive methylene group or a phenolic hydroxyl group which permits reaction of the coupler with the oxidized developer to form dyes in the photographic layer. The presence of a sulphonamido group in these couplers improves considerably the appearance of the resulting dyes. The presence of both the mercapto group and the sulphonamido group is of value in other cases where compounds are introduced in photographic emulsions in the form of salts with silver or with some other heavy metal.

Moreover, it is often desirable in the process referred to above to introduce both critical groups with as little as possible increase in the molecular weight of the compound. This restriction is desirable in the color processes of this type in order that the coupler can be removed after processing to avoid its adverse effect on the finished image.

It is therefore an object of the present invention to provide a new compound containing a potential mercapto group and capable of producing a sulphonamido group by reaction with a primary amino group in compounds containing active methylene or phenolic hydroxyl groups. A further object is to provide a method for preparing such compounds.

These objects are accomplished according to our invention by the synthesis of a new compound, β-acetylmercaptoethanesulphonyl chloride, $CH_3COSCH_2CH_2SO_2Cl$, which combines an $—SO_2Cl$ group and an $—SCOCH_3$ group by means of two $CH_2$ groups. The $—SO_2Cl$ group serves to condense the compounds with primary amines, thus forming the desired sulphonamido group $—SO_2NH—$, and introducing at the same time $SCOCH_3$ into the molecule with the smallest practical increase in molecular weight. Other acyl groups, such as propionyl, might be used.

The use, in the preparation of couplers, of acetyl thioglycolyl chloride which combines an $SCOCH_3$ group with a carboxylic acid chloride group, is described in Weissberger, Kibler and Young U. S. patent application, Ser. No. 539,780. This compound does not, however, provide a means for the introduction of a sulphonamido group into the resulting coupler.

The compound we have described may be prepared by the reaction of sodium or other alkali metal thioacetate with sodium or other alkali metal β-bromoethanesulphonate to produce sodium or other alkali metal β-acetylmercaptoethanesulphonate, according to the following equation:

$$CH_3COSNa + BrCH_2CH_2SO_3Na \rightarrow CH_3COSCH_2CH_2SO_3Na + NaBr$$

The latter then is converted to the corresponding sulphonyl chloride by reaction with a phosphorous halide, as follows:

$$3CH_3COSCH_2CH_2SO_3Na + POCl_3 \rightarrow CH_3COSCH_2CH_2SO_2Cl + Na_3PO_4$$

The following example illustrates the method of preparing the compound:

To a hot solution of 1 equivalent of sodium β-bromoethanesulphonate in 95% ethanol is added, all at once, a solution of 1.1 equivalents of sodium thioacetate in 95% ethanol. After refluxing the mixture for four hours, it is cooled and filtered to give a good yield of the sodium β-acetyl-mercaptoethanesulphonate. Recrystallization from 95% ethanol gives pearly flakes, M. P. 287–9° dec.

The powdered sodium β-acetylmercaptoethanesulphonate is stirred with an excess (160% by weight) of phosphorous oxychloride on the steam-bath for half an hour. The excess phosphorous oxychloride is removed by concentration in vacuo, the residue slurried with carbon tetrachloride and the mixture stirred with ice water. After washing well with water the carbon tetrachloride layer is dried, and concentrated in vacuo. A 40% yield of β-acetylmercaptoethanesulphonyl chloride, B. P. 65–70° at .2 mm., is obtained by distillation of the residue.

What we claim is:

1. The compound β-acetylmercaptoethanesulphonyl chloride.

2. The method of preparing β-acetylmercaptoethanesulphonyl chloride, which comprises refluxing an alkali metal β-bromoethanesulphonate with an alkali metal thioacetate to form an alkali metal β-acetylmercaptoethanesulphonate, separating said last-mentioned compound by cooling the mixture, and reacting said last-mentioned compound with a chloride of phosphorus to form β-acetylmercaptoethanesulphonyl chloride.

3. The method of preparing β-acetylmercaptoethanesulphonyl chloride, which comprises refluxing sodium β-bromoethanesulphonate with sodium thioacetate to form sodium β-acetylmercaptoethanesulphonate, separating said last-mentioned compound by cooling the mixture, and reacting said last-mentioned compound with phosphorus oxychloride to form β-acetylmercaptoethanesulphonyl chloride.

HENRY D. PORTER.
ARNOLD WEISSBERGER.